Sept. 1, 1964 J. W. VOLKERT 3,146,500
SPACE CHAMBER INTERLOCK DOOR AND DOOR FRAME
Filed July 27, 1961 3 Sheets-Sheet 1

INVENTOR.
JOHN W. VOLKERT
BY
Bernard A. Chiama
ATTORNEY

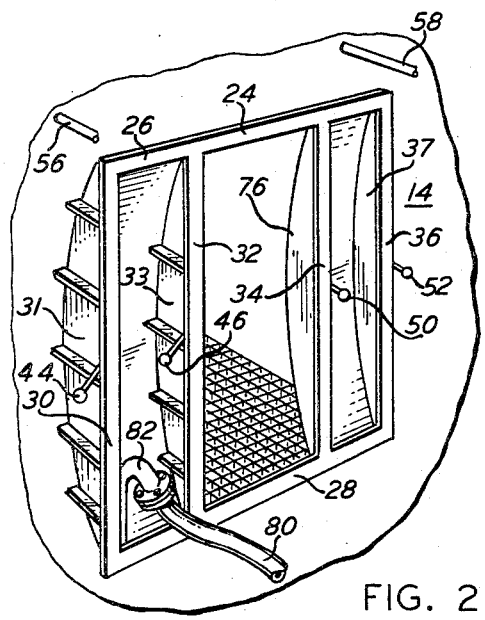
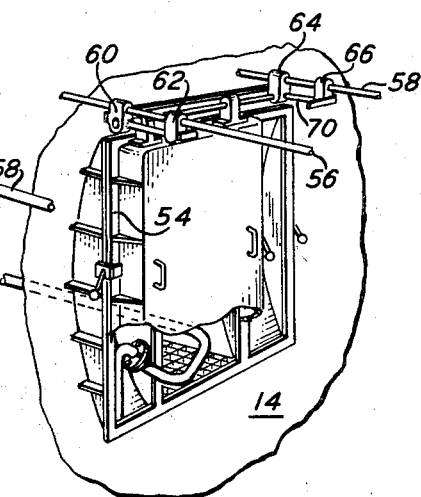
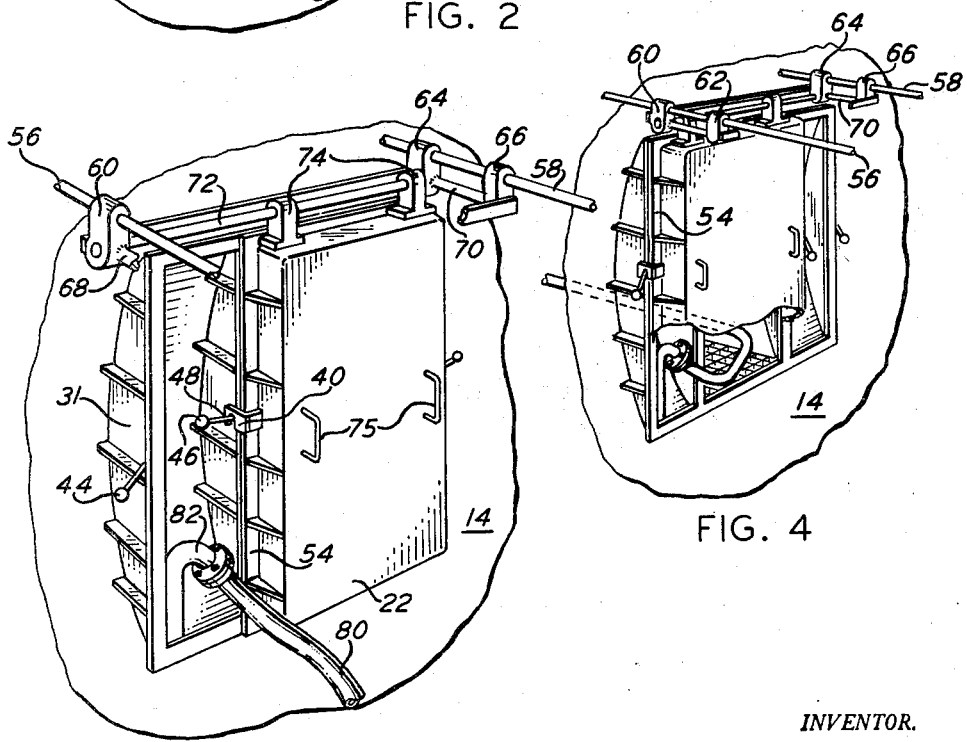
FIG. 2
FIG. 3
FIG. 4
INVENTOR.
JOHN W. VOLKERT
BY Bernard A. Chiama
ATTORNEY Sept. 1, 1964   J. W. VOLKERT   3,146,500
SPACE CHAMBER INTERLOCK DOOR AND DOOR FRAME
Filed July 27, 1961   3 Sheets-Sheet 3

*INVENTOR.*
JOHN W. VOLKERT
BY
Bernard A. Chiara
ATTORNEY

3,146,500
SPACE CHAMBER INTERLOCK DOOR AND DOOR FRAME

John W. Volkert, Rochester, N.Y., assignor to Consolidated Vacuum Corporation, Monroe County, N.Y., a corporation of New York
Filed July 27, 1961, Ser. No. 127,238
6 Claims. (Cl. 20—16)

The present invention relates to doors and door frames and more particularly, to space doors and supporting frames for test chambers such as high altitude simulator chambers and the like.

Generally, test chambers and facilities utilize entry lock chambers in association with a main test chamber in order to provide an area wherein observers and controls may be housed when the main test chamber is evacuated or is being pumped down. The human test subject may be clothed in a space suit with attached umbilical cord connected to the equipment within the test chamber. On occasion, it is desirable that the human test subject should be removed from the test chamber without dismantling the umbilical cord and space suit and that other equipment and materials or human test subjects to be tested placed in the test chamber.

The present invention provides a space door and frame arrangement which may be utilized between a main test chamber and entry lock chamber for permitting movement of the human test subject into the lock chamber and resealing of the space door without the necessity for detaching and attaching the umbilical cord during this movement. To this end, there is provided a space door frame which will allow the sealing of a space door at two different positions, one of which is utilized while the test subject is in the main test chamber and the other, when the subject is in the lock chamber.

The object of the present invention is to permit the transfer of a human test subject between sealed chambers of a testing facility without requiring the dismantling of the umbilical cord connecting the test subject to a single point in the facility.

Another object of the present invention is to provide a fail-safe door between sealed chambers whereby removal of the door may be accomplished in a minimum of time and with minimum effort.

Other objects and advantages will become apparent after studying the following description when taken in conjunction with the accompanying drawings wherein:

FIGURE 2 is a perspective view of the door frame of the present invention;

Figure 5:
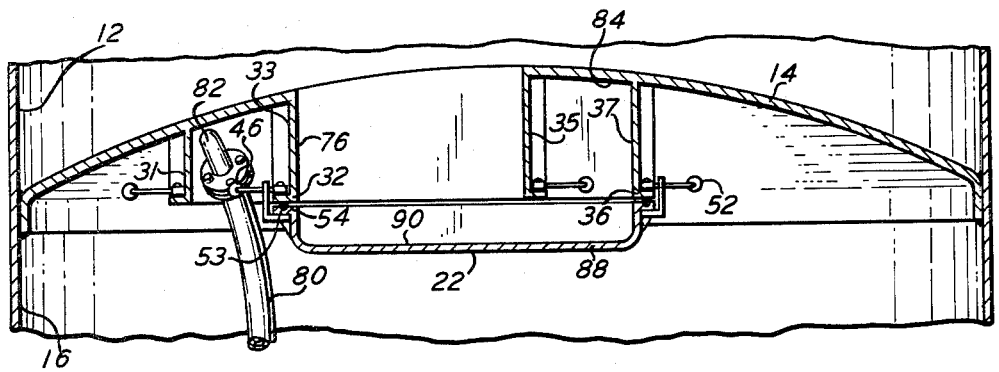
Figure 6:
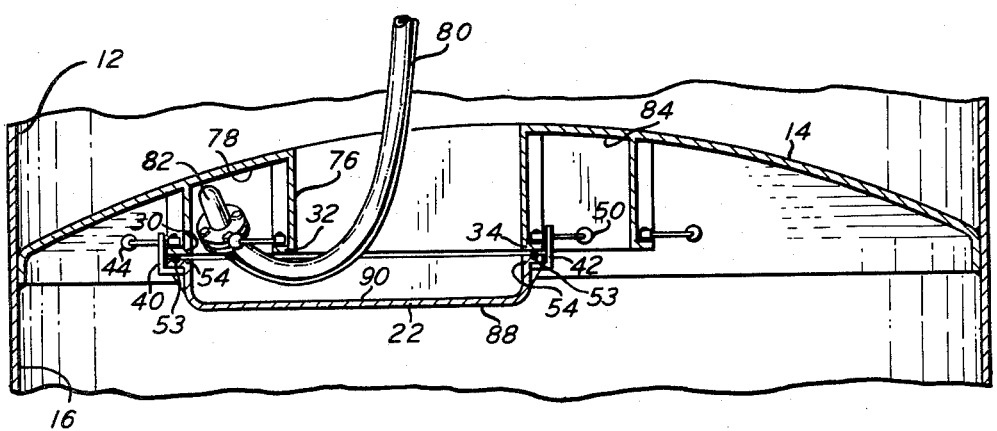

FIGURES 3 and 4 are perspective views of two positions respectively, that the space door of the present invention may assume; and FIGURES 5 and 6 are cross sectional views illustrating the space doors of FIGURES 3 and 4 respectively, in sealed positions.

Figure 1:
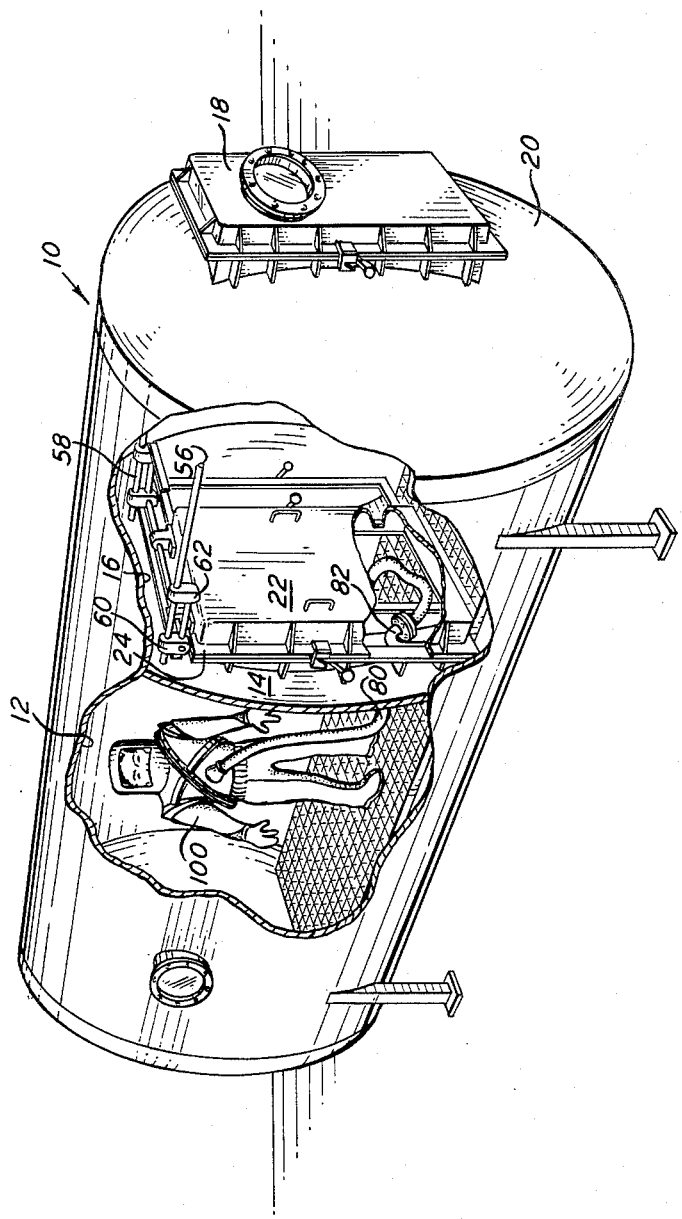
FIGURE 1 is a perspective view of a space testing facility employing the present invention.

Referring to FIGURE 1 of the drawing, there is shown a high altitude simulator testing facility indicated generally by the reference numeral 10. The facility 10 may be of the conventional type comprising a relatively large main testing chamber 12 having a wall 14 intermediate the ends thereof and an entry lock chamber 16 separated from the main chamber 12 by the wall 14. The facility 10 may be entered through a door 18 associated with the end wall 20 of the facility and which allows ingress and egress of the entry lock chamber 16. An interlock door 22 and frame 24 is arranged in the wall 14 in order to seal the chambers 12 and 16 from each other.

Testing facilities of the type illustrated in FIGURE 1 are utilized to test human subjects and equipment in the main chamber 12 from which air is evacuated by a suitable vacuum pumping system, not shown. By reducing and controlling the pressure within the chamber 12, high altitude pressure conditions may be simulated. The chamber 16 generally houses the altitude control devices for the main chamber and observers and attendants may occupy the chamber when the main chamber is in testing condition.

In very high altitude simulation where a human test subject is exposed to extreme conditions and a space suit is required, the latter must be serviced by an umbilical cord which connects the space suit to a source of air pressure or oxygen. Generally, electrical conductors or wires are also contained in the cord and connect various sensing devices associated with the test subject to corresponding indicators and recorders in the entry lock chamber. Other devices associated with the test subject such as communication devices that are contained in the space suit may be electrically connected to remote receiving devices by means of the umbilical cord.

With the advent of space units and umbilical cords for the testing facilities of today, problems have arisen which seriously limit the movement of the test subject between the main chamber and the entry lock chamber. In preparing for a test in a conventional test facility, it is customary for the human test subject to complete his suiting-up in the main chamber 12 where final connections are made by means of the umbilical cord which in turn is connected to a receptacle within the main chamber itself.

In the event that it is desired to momentarily replace the test subject with other test subjects in the main chamber, it is necessary that all connections to the test subject through the umbilical cord be broken before leaving the main chamber, and, after entry into the entry lock chamber, be reconnected to a similar testing and control equipment. In doing this, testing of the test subject is halted and adjustments must be made to condition the test subject to a different environment, that is, the space conditions in the entry lock chamber. In addition, other test subjects replacing the initial test subject can be completely connected in the main chamber only after the main chamber is opened and available for use. The initial test subject upon reentering the main chamber is once again attended to for complete connection. During all this time that test subjects are moving between the two chambers, their space suits must become reconditioned and testing devices adjusted for space conditions of the suit.

In the present invention, the wall 14 is provided with an interlock door 22 and a multiple door frame 24 which will permit opening and closing of the door while the umbilical cord is still connected to the space suit of the test subject.

To accomplish this goal, the door 22 is adapted for closing in two positions relative to the door frame 24, one of the positions being utilized when the test subject is in one chamber and the other position being utilized when the test subject is in another chamber. As shown in FIGURE 2, the multiple door frame 24 comprises an upper head plate 26 and a lower sill plate 28 mounted upon the wall 14. Mounted between the plates 26 and 28 are four vertically extending side jamb plates 30, 32, 34 and 36 made integral with the head and sill plates 26, 28, respectively, and arranged therebetween. The plates 30, 32, 34 and 36 are connected to the wall 14 by web plates 31, 33, 35 and 37 respectively.

The side jamb plates 30, 34 and the included portions of the head plate 26 and sill 28 cooperate to form a first door frame for one closing position of the door and the side jamb plates 32, 36 and the included portions of the head plate 26 and sill 28 cooperate to form a second door frame for another closing position of the door. As shown in FIGURES 3 and 5, the door 22 is shown in one closed position relative to one door frame and in FIGURES 4 and 6, the door is shown in closed position relative to the second door frame.

At either side of the door 22, there is provided a lock plate 40, 42 which may be welded or otherwise secured to the door sides. The plate 40 is angled toward the frame 24 and is adapted to overlap either of the jamb plates 30, 32, depending upon the particular closing position of the door. Similarly, the plate 42 is adapted to overlap either of the side jambs 31, 36 depending upon the particular closing position of the door.

Mounted upon each side jamb 30, 32, is a pivotal lever handle 44, 46, each of which is adapted to be rotated upwardly to place the same into a tapered slot 48 formed in the lower edge of the plate 40 thereby locking the door 22 in position relative to each of the side jambs 30, 32, respectively. Lever handles 50, 52 are provided on side jambs 34, 36 respectively, to cooperate with each plate 42 on the other side of the door for securing this side relative to the jambs 34, 36. A sealing device 53 such as, an elastic beading may be incorporated into the flat flange 54 of the door 22 in order to present a vacuum tight seal between the door and the cooperating flat surfaces of the jambs and the plates 26, 28 of the multiple frame 24 when the door is in either of its closed positions.

In rotating either pair of handles 44, 46 and 50, 52 to lock the door 22 in either closing position, the sealing device 53 is partially compressed between the surfaces of the flange 54 and the cooperating elements of the frame 24. Upon pump-down of the main chamber 12, the sealing device 53 is further compressed due to the pressure differential on the sides of the door. This additional compression of the sealing device will loosen either of the pairs of handles 44, 46 and 50, 52, as the case may be, and these handles will lower themselves by gravity and become disengaged from their respective lock plates 40. Upon this occurrence, the door 22 is in fail-safe condition, being held in vacuum tight position by the pressure differential. In the event an emergency exists in the main chamber and it is imperative that entry into this chamber be immediate, it is only required that the pressure therein be brought up to the pressure within the entry lock chamber whereupon the door 22 will separate from the door frame without requiring manipulation of the lock handles. In this manner, the attendants are free to perform other duties during the emergency period before the door is opened and the possibility of bungling the opening of the door is avoided.

An over-head rail system is provided for permitting movement of the door to the open or either closed position relative to the frame 24. The rail system comprises a pair of parallel arranged rail rods 56, 58 extending from the wall 16, one on either side of the frame 24. Each of these rods may be suitably secured at one end to the wall 16 and at the other end to the end wall 20 of the testing facility 10.

Mounted upon the rail rods 56, 58 and movable therealong is a door carriage which includes a first pair of slide blocks 60, 62 movable along the rod 56 and a second pair of slide blocks 64, 66 movable along the rod 58. The blocks 60, 62 are spaced a short distance from each other and are joined together by a link 68 to present a single movable unit upon the rod 56. Similarly the blocks 64, 66 are spaced apart a short distance along the rod 58 and are joined together by a link 70.

Between the blocks 60, 64, there is secured thereto a rod 72 which is arranged parallel to and slightly above and out from the head plate 26 of the frame 24. Slidably mounted upon the rod 72 is a pair of lugs 74 which are suitably secured to the upper end of the door 22. It will be apparent that this structure of the door carriage will permit sliding of the door upon the rod 72 to either of the closed positions and sliding of the door carriage upon the rail rods 56 and 58 to open door and maintain the same in any desired distance from the frame 24. Suitable handles 75 are secured to the door to facilitate manual manipulation of the same. The door 22 is also adapted for pivotal movement on the rod 72 and, during emergencies, when the pressure in the main chamber is quickly brought up to atmosphere and the door becomes free of the door frame, the door may be pivoted upon the rod 72 to enable an attendant to enter the main chamber in the shortest possible time.

The wall 14 of the testing facility 10 is slightly spherically curved toward the main test chamber 12 and is formed with a door opening 76 between the web plates 33 and 35 of the inner side jambs 32 and 34 respectively. Between the jambs 32 and 30 and defined by the adjacent portion of the wall 14 and the web plates 31 and 33 is a well 78 which, for the present illustration, serves as the inclosing space for the outside connection of an umbilical cord 80, the purpose of which will be described hereinafter. The cord 80 is connected to an outlet socket 82 which may communicate with sources of air and electricity located outside the testing facility for servicing testing equipment or test specimens within the facility. The well 78 may also serve as a storage space for the cord 80.

On the other side of the doorway or opening 76 between the jambs 34 and 37 and defined by the webs 35 and 37 and the included portion of the wall 14 is a second well 84 which may also contain an outlet socket for an umbilical cord or other conduit devices. As shown in FIGURES 5 and 6, the door 22 is formed so that the flange 54 therefor extends away from the main portion 88 of the door so as to provide a spacing 90 within the door. This spacing extends the width and length of the door and is of sufficient depth to provide a relatively wide clearance between the main portion 88 of the door and the jambs 32 and 34 when either of these is not involved in a door closing.

The purpose of this spacing 90 and the wells 78 and 84 will be apparent after studying FIGS. 5 and 6. In FIGURE 5, with the door in its first closing position against jambs 32 and 36, the well 78 is exposed to the lock chamber 16 thus exposing the umbilical cord 80 to use from this chamber. With the door in its second closing position against jambs 30 and 34, as shown in FIG. 6, the well 78 is closed relative to the lock chamber but open to the main chamber 12 thus permitting access to the cord 80 from that chamber. It will be noted that, the spacing 90 in the door 22 allows the cord to clear the jamb 32 when the door is in the position indicated in FIG. 6. It will also be apparent that the well 84 may also accommodate an umbilical cord and be available for either of the chambers of the facility 10.

The door and door frames described in the foregoing lends itself to many uses relative to personnel and equipment that may move from one chamber room to another. To illustrate, the human test specimen 100 is shown in FIG. 1 as being clothed in a space suit which is connected by the umbilical cord 80 to a suitable source of air (not shown) brought through the outlet socket 82 adjacent the wall 14 of the testing facility but on the side thereof that faces the lock chamber 16. The cord 80 may contain other flexible leads such as electrical conductors for servicing the space suit with heat and conductors leading to sensing instruments applied to the test specimen and indicated and recorded on remotely located instruments. Instead of a human test specimen in the main chamber 12, there may be other specimen such as materials or instruments which are connected through an umbilical cord to an outlet socket with any or both of the door wells 78 and 84.

As shown in FIG. 1, the door 22 is locked and sealed relative to the first door frame comprising structural elements 30, 26, 34 and 28 of the frame 24. The cord 80 originates in the well 78, extends around the jamb 32, this being possible because of the door spacing 90, and projects into the test chamber 12 for use by the test specimen. In the event, the test specimen desires to leave the test chamber or is required to for emergency reasons and it is desired or required to maintain attachment to the umbilical cord, the door may be unlocked, moved away from the frame 24 to allow egress of the test specimen and the umbilical cord. The door may then be closed and locked in its second position which involves the use of second door frame comprising elements 32, 26, 36 and 28. In this manner the test chamber may be immediately pumped down again for other purposes. In both closing positions of the door, the doorway 76 is closed so that individual environmental treatment may be accorded either or both of the chambers 12 and 16. A human test specimen may be fitted in the lock chamber 16 while other human test specimens are in the main test chamber 12. The door may then be manipulated, as discussed above, in order to facilitate quick exchanges or additions of specimens and the relocking and sealing of the door.

I claim:

1. A door and door frame combination comprising a main frame having at least four vertically positioned side jamb plates, a head plate connecting said jamb plates at their upper ends and a sill plate connecting their lower ends; a door opening defined by a second and a third of said jamb plates and the included portions of said head and sill plates; a door mounted for movement along the plane of said main frame; said door being adapted to bridge across a first and the third of said jamb plates for closing said doorway in one closing position of the door and to bridge across the second and a fourth of said jamb plates for closing said doorway in another closing position of the door; and mounting means for supporting said door for movement in a direction normal to the plane of the door frame for permitting opening and closing of said door opening.

2. A door and door frame combination comprising a main frame having at least four vertically positioned side jamb plates, a head plate connecting said jamb plates at their upper ends and a sill plate connecting their lower ends; a door opening defined by a second and a third of said jamb plates and the included portions of said head and sill plates; a door arranged for movement along the plane of said main frame; mounting means for said door, including pivotal means arranged horizontally for permitting pivotal movement of said door in a vertical plane; said door being adapted to bridge across a first and the third of said jamb plates for closing said doorway in one closing position of the door and to bridge across the second and a fourth of said jamb plates for closing said doorway in another closing position of the door; said mounting means supporting said door for movement in a direction normal to the plane of the door frame for permitting opening and closing of said door opening.

3. A door and door frame combination comprising a main frame having at least four vertically positioned side jamb plates, a head plate connecting said jamb plates at their upper ends and a sill plate connecting their lower ends; a door opening defined by a second and a third of said jamb plates and the included portions of said head and sill plates; a door mounted for movement along the plane of said main frame; said door being adapted to bridge across a first and the third of said jamb plates for closing said door way in one closing position of the door and to bridge across the second and a fourth of said jamb plates for closing said doorway in another closing position of the door; lock means associated with said door and jamb plates for locking said door in either of its closing positions and being adapted to assume an unlocked condition when a pressure differential is experienced by said door; and mounting means for supporting said door for movement in a direction normal to the plane of the door frame for permitting opening and closing of said door opening.

4. A door and door frame combination comprising a main frame having at least four vertically positioned side jamb plates, a head plate connecting said jamb plates at their upper ends and a sill plate connecting their lower ends; a door opening defined by a second and a third of said jamb plates and the included portions of said head and sill plates; a door mounted for movement along the plane of said main frame; said door being adapted to bridge across a first and the third of said jamb plates for closing said doorway in one closing position of the door and to bridge across the second and a fourth of said jamb plates for closing said doorway in another closing position of the door; a well formed between the first and the second of said jamb plates and being exposed to the space on one side of said doorway when said door is in said another closing position; said well being exposed to the space on the other side of the doorway when said door is in said one closing position; and mounting means for supporting said door for movement in a direction normal to the plane of the door frame for permitting opening and closing of said door opening.

5. A door and door frame combination comprising a main frame having at least four vertically positioned side jamb plates, a head plate connecting said jamb plates at their upper ends and a sill plate connecting their lower ends; a door opening defined by a second and a third of said jamb plates and the included portions of said head and sill plates; a door mounted for movement along the plane of said main frame; said door being adapted to bridge across a first and the third of said jamb plates for closing said doorway in one closing position of the door and to bridge across the second and a fourth of said jamb plates for closing said doorway in another closing position of the door; a deformable sealing device mounted on the edge of said door and cooperable with said jamb plates, head plate and sill plate when said door is in either of its closing positions; and lock means associated with said door and jamb plates and being adapted to compress said sealing device and lock said door in its closing positions; said lock means being adapted to assume an unlocked condition when a pressure differential is experienced by said door and the sealing device is further compressed.

6. A door and door frame combination comprising a main frame having at least four vertically positioned side jamb plates, a head plate connecting said jamb plates at their upper ends and a sill plate connecting their lower ends; a door opening defined by a second and a third of said jamb plates and the included portions of said head and sill plates; a door mounted for movement along the plane of said main frame; said door being adapted to bridge across a first and the third of said jamb plates for closing said doorway in one position of the door and to bridge across the second and a fourth of said jamb plates for closing said doorway in another closing position of the door; mounting means for said door including a pair of support bars extending normal to the plane of said main frame; a carriage slidably mounted on said support bars and movable toward and away from said main frame; a rod carried by said carriage and mounted thereon transversely to the direction of said support bars; and means secured to said door and slidably mounted on said rod for supporting said door and permitting movement of the same in the plane of the main frame, movement of the door in a plane normal to the frame and rotative movement about the axis of said rod.

References Cited in the file of this patent

UNITED STATES PATENTS

| | | |
|---|---|---|
| 266,829 | Johnston | Oct. 31, 1882 |
| 2,578,096 | Smith | Dec. 11, 1951 |
| 2,631,077 | Clingman | Mar. 10, 1953 |